Figure 1:
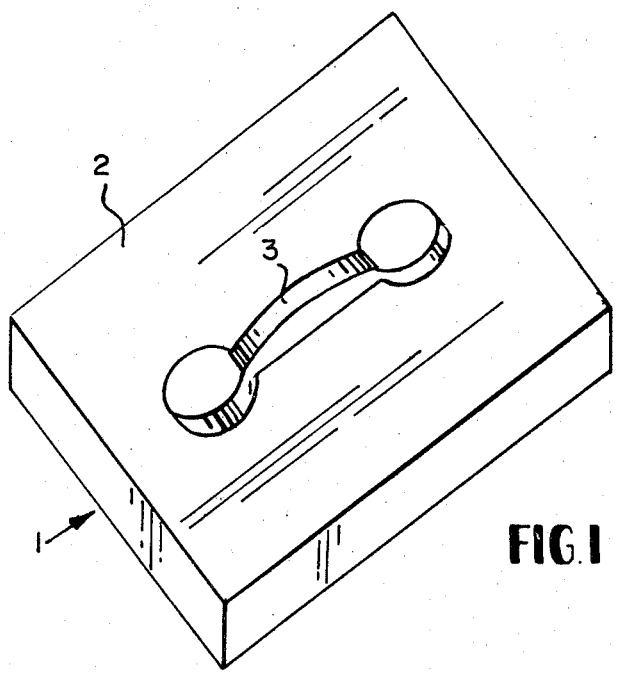

United States Patent [19]

Hellman et al.

[11] 3,869,318
[45] Mar. 4, 1975

[54] MOULD FOR MANUFACTURING PLASTIC ARTICLES, AND METHOD OF MANUFACTURING THE MOULD

[75] Inventors: Per Ingvar Hellman; Jan Ivar Sondell; Bo Christian Jershed, all of Soderfors, Sweden

[73] Assignee: Stora Kopparbergs Bergslags Aktiebolag, Falun, Sweden

[22] Filed: May 24, 1973

[21] Appl. No.: 363,412

[30] Foreign Application Priority Data
May 26, 1972 Sweden.......................... 72006990

[52] U.S. Cl............ 148/12.3, 75/123 G, 75/123 N, 75/123 J, 75/123 K, 148/31, 148/142, 249/135
[51] Int. Cl..... B29c 1/02, C22c 41/02, C22c 39/30
[58] Field of Search........ 249/135, 123 G; 75/123 J, 75/123 K, 123 N; 148/2, 3, 12.3, 142, 31

[56] References Cited
UNITED STATES PATENTS
2,516,125   7/1950   Kramer et al..................... 75/123 N
3,720,545   3/1973   Steven et al....................... 249/135

FOREIGN PATENTS OR APPLICATIONS
440,894   1/1936   Great Britain................... 75/123 N Primary Examiner—C. Lovell
Attorney, Agent, or Firm—Curtis, Morris & Safford

[57] ABSTRACT

A mould for the manufacture of plastic articles consists of a precipitation-hardening alloyed steel containing up to 0.05% carbon, 5–7% nickel, 4.5–7% manganese, up to 2% molybdenum, the remainder, apart from impurities, being iron. A blank is first soft-annealed, subsequently machined to the desired shape, hardened by a heat-treatment, and finally polished.

4 Claims, 2 Drawing Figures

MOULD FOR MANUFACTURING PLASTIC ARTICLES, AND METHOD OF MANUFACTURING THE MOULD

The present invention relates to a mould for manufacturing plastic articles for example by means of compression moulding, extrusion moulding or injection moulding, consisting of a precipitation-hardening alloyed steel. The invention also relates to a method of manufacturing such a mould.

A mould for manufacturing plastic components shall have high durability. The mould must be able to withstand wear, and it shall be so hard that scratches are avoided, as far as possible, in the engraving. Furthermore, it must be so tough or ductile that during use it can withstand any uneven loading or knocks to which it may be subjected. The total cost of tools for the manufacture of plastic articles shall be as low as possible. A certain increase in material costs may thus be tolerated if savings of at least the same magnitude can be achieved by improving the properties mentioned above.

The following are therefore the requirements for tool steel for such moulds:

1. Good machinability. Engraving in the mould is primarily performed by means of chip-cutting machining.
2. Good polishability. In most cases the engraving in the mould must be polished to satisfactory surface smoothness. For certain purposes, even, a highly polished surface is required.
3. Good hardenability. Great and uniform hardness must be possible even for large moulds and in moulds with varying wall thickness.
4. Great stability of dimension during heat-treatment. Alternations in dimensions and warping during heat-treatment of moulds having engraving of a somewhat complicated nature necessitate subsequent adjustment of the engraving which is extremely expensive. Stability of dimension is therefore perhaps the most important property.

Moulds for manufacturing plastic articles are to a great extent nowadays made of toughened steel of type SIS 2541, for example. The steel is delivered already heat-treated to a hardness of 280–320 HB, and no further heat-treatment is, therefore, required after the engraving has been performed. The important requirement No. 4 is thus fulfilled. The ease of cutting in steel of this degree of hardness may be considered acceptable, but an improvement would be desirable. This comparatively low hardness results in a poor resistance to wear. However, the hardness cannot be increased since this would considerably impair the feasibility of cutting. By using qualified metallurgical processes (vacuum degassing, electro-slag remelting, etc.) a slag-purified steel can be produced, but due to its low degree of hardness it is often impossible to polish the surface sufficiently.

The second type of mould material in general use nowadays is hartempering steel of type SIS 2140, SIS 2550 and SIS 2242. The engraving is then performed while the steel is in annealed state and can therefore be cut easily. The mould is then heat-treated by hardening and tempering to a high degree of hardness, 46–56 HRC, which gives good resistance to wear and may also give a surface which can be polished well. However, alterations in dimension and warping occur during this heattreatment, and subsequent adjustment is, therefore, necessary. This adjustment is extremely expensive.

It would, therefore, appear that the requirements for a tool steel for moulds for the manufacture of plastic articles are incompatible, and the choice of steel in each case becomes a compromise in which important properties must be sacrificed.

Recently, research has been made into the feasibility of using precipitation-hardening alloyed steel for such moulds. Such steel is delivered in solution heat treated state with relatively low degree of hardness, and in this state the mould can be machined to the desired shape. The mould is then aged by treatment at about 500°C for some hours, and an increase in the degree of hardness is thus obtained with very small alterations in dimension. A typical steel of this type is so-called maraging (martensitic-aging) steel which contains 18 % Ni, 8 % Co, 5 % Mo, 0.2 % Ti, 0.1 % Al and the remainder Fe. With such a steel most of the requirements can be fulfilled, but the steel contains high percentages of expensive alloying substances and is, therefore, many times more expensive than the steel previously used.

No low-alloyed steel exists today which fulfils the requirements listed above and particularly the requirement for a high degree of final hardness. In order to achieve the desired degree of final hardness (about 500 HV) it has been necessary to add relatively large quantities (2 %) Ti, which results in metallurgical problems. Ti-rich inclusions are formed in the steel, which therefore becomes brittle and is difficult to polish. It has also been considered that, if nickel is replaced by manganese, the steel becomes brittle in the precipitation-hardened state.

It has now been found that, according to the invention, it is possible to obtain moulds which fulfil the requirements listed without using steel having a high percentage of alloying substances. The mould of the invention consists of a precipitation-hardening alloyed steel containing up to 0.05 % carbon, 5–7 % nickel, 4.5–7 % manganese, up to 2 % molybdenum, the remainder, apart from impurities, being iron. The specified combination of low carbon content together with limited nickel and manganese contents produces a steel which is converted to martensite upon cooling. Martensite is not too hard to be machined by a cutting process, and the hardness of martensite can be increased by means of precipitation-hardening. Certain experiments indicate that the toughness can be increased, while retaining the other properties by the addition of up to 2 % molybdenum. Moulds according to the invention after precipitation-hardening, have a degree of hardness of at least 400 HV (Vickers hardness). The hardness may be increased to at least 500 HV if the steel contains 0.005–0.03 % by weight carbon, 6–7 % by weight nickel, 5.5–6.5 % by weight manganese, and 0.2–1.2 % by weight molybdenum. If this steel contains silicon, phosphorus, sulphur and nitrogen, these elements should be present in quantities lower than 0.4 % Si, 0.035 % P, 0.035 % S, and 0.01 % N..

The upper limits of the alloy contents are determined by the requisite that when cooling in the air from the solution heat treatment temperature, the martensite conversion in the steel should be substantially complete by the time the steel reaches a temperature of approximately 25°C. Dilatometric experiments show that this is the case if the Ni content is about 7 % at the most and the Mn content max. 6.5 %. A steel having a chemical composition within these limits has been tested with respect to ease of cutting. The steel was tested first in solution treated state with a hardness of 330–350 HV. By way of comparison a conventional, toughened plastic mould steel having a hardness of 300 HV was tested simultaneously. When milling was performed using a high-speed steel tool it was found that more than double the volume could be machined in the new steel than in the toughened steel before the milling tool was worn out. Coarse and fine milling using both hard metal tools and high-speed steel tools produced very smooth surfaces. Furthermore, it was found that in spite of the high degree of hardness, it was possible to machine the new steel without problems, even when drilling and cutting screw threads. Even in aged state the new steel was surprisingly easy to cut in comparison with the toughened steel. Cutting in untempered state can be further facilitated by the addition of 0.035 – 0.20 % sulphur.

Especially by using vacuum degassing or electro-slag remelting, it has been found possible to manufacture the new steel free from slag which, together with the high degree of hardness, means that the requirement of polishability is satisfactorily fulfilled. Alterations in length upon aging have been measured at less than 0.03 %, i.e., the requirement of stability of dimension is very satisfactorily fulfilled. The aging process is further simplified since it can be performed at temperatures as low as 400°C.

Figure 2:
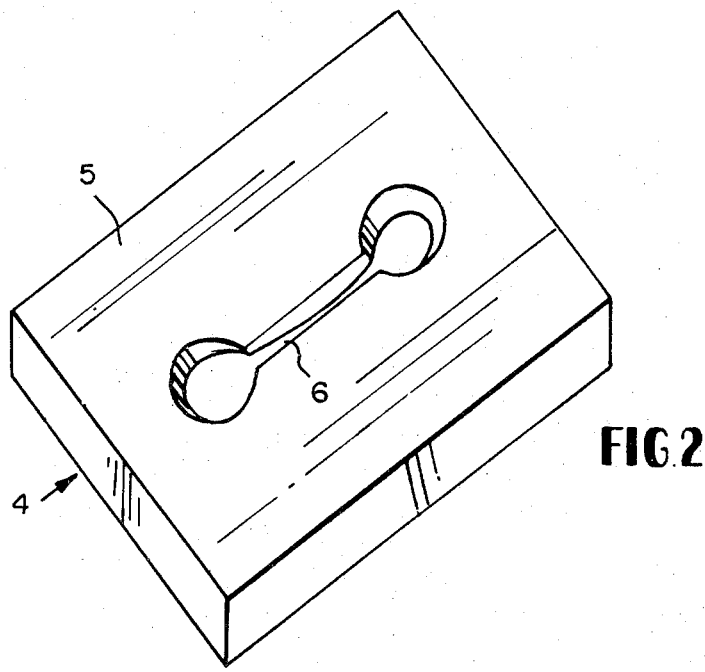

In the accompanying drawings FIGS. 1 & 2 illustrate a mould for the manufacture of the shell for the receiver of a telephone set.

As shown in the drawings the mould consists of an upper die (patrix) 1, and a lower die (matrix) 4. As shown in FIG. 1 the upper die consists of a steel block having a flat surface 2 containing a protruding portion 3. As shown in FIG. 2 the lower die consists of a steel block having a flat surface 5 containing a recessed portion 6. The upper and lower dies have been machined while the steel is in the soft-annealed state. Thereafter, the dies have been heat-treated so as to transform the steel into the precipitation-hardened state. The dies are finally polished, as known per se.

When a plastic article is to be moulded a predetermined quantity of granular plastic material is placed in the recessed portion 6, the upper die 1 is placed upon the lower die 2 so that the protruding portion 3 engages the recessed portion 6, and the two dies are pressed towards each other until the plastic material has filled the space in the mould.

What is claimed is:

1. A steel mould for manufacturing plastic articles which consists essentially of a precipitation-hardened alloyed steel of 0.005% to 0.03% carbon, 6 to 7% nickel and 5.5 to 6.5% manganese, less than 0.4% silicon, up to 1.2% molybdenum, less than 0.035% phosphorus, less than 0.035% sulphur, and less than 0.01% nitrogen, balance iron.

2. A steel mould for manufacturing plastic articles which consists essentially of a precipitation-hardened alloyed steel of 0.005% to 0.03% carbon, 6 to 7% nickel and 5.5 to 6.5% manganese, less than 0.4% silicon, up to 1.2% molybdenum, less than 0.035% phosphorus, 0.035 to 0.20% sulphur, and less than 0.01% nitrogen, balance iron.

3. A method of manufacturing a steel mould for shaping plastic articles, comprising the steps of providing a blank of a precipitation-hardening alloyed steel consisting essentially of, in addition to iron, 0.005 to 0.03% by weight carbon, 6 to 7% by weight nickel, 5.5 to 6.5% by weight manganese, up to 1.2% by weight molybdenum, less than 0.4% by weight silicon, less than 0.035% by weight phosphorus, less than 0.035% by weight sulfur, and less than 0.01% by weight nitrogen, hardening the blank to a comparatively low hardness by heating it at a temperature of 800° to 1,050°C for approximately 1 hour, allowing said blank to cool in air, machining the blank to a desired mould, hardening the machined mould by heating it at a temperature of 400° to 500°C for 12 to 36 hours, and polishing the hardened mould.

4. A method of manufacturing a steel mould for shaping plastic articles, comprising the steps of providing a blank of a precipitation-hardening alloyed steel consisting essentially of, in addition to iron, 0.005 to 0.03% by weight carbon, 6 to 7% by weight nickel, 5.5 to 6.5% by weight manganese, up to 1.2% by weight molybdenum, less than 0.4% by weight silicon, less less than 0.035% by weight phosphorus, 0.035 to 0.20% by weight sulphur, and less than 0.01% by weight nitrogen, hardening the blank to a comparatively low hardness by heating it at a temperature of 800° to 1,050°C for approximately one hour, allowing said blank to cool in the air, machining the blank to a desired mould, hardening the machined mould by heating it at a temperature of 400° to 500°C for 12 to 36 hours, and polishing the hardened mould.

* * * * *